United States Patent [19]
Hanson

[11] Patent Number: 6,016,336
[45] Date of Patent: Jan. 18, 2000

[54] INTERACTIVE VOICE RESPONSE SYSTEM WITH CALL TRAINABLE ROUTING

[75] Inventor: Bruce Lowell Hanson, Little Silver, N.J.

[73] Assignee: AT&T Corp, New York, N.Y.

[21] Appl. No.: 08/972,306

[22] Filed: Nov. 18, 1997

[51] Int. Cl.[7] .................................................. H04M 1/64
[52] U.S. Cl. .................... 379/88.23; 379/71; 379/88.25; 379/93.12; 379/917
[58] Field of Search .......................... 379/71, 76, 88.01, 379/88.19, 88.2, 93.12, 210, 214, 265, 266, 309, 917, 88.25, 88.16, 88.23

[56] References Cited

U.S. PATENT DOCUMENTS

| | | | |
|---|---|---|---|
| 4,680,729 | 7/1987 | Steinhart | 345/173 |
| 4,932,021 | 6/1990 | Moody | 379/88.25 |
| 5,003,595 | 3/1991 | Collins et al. | 380/25 |
| 5,553,121 | 9/1996 | Martin et al. | 379/88.01 |
| 5,598,279 | 1/1997 | Ishii et al. | 358/402 |
| 5,724,406 | 3/1998 | Juster | 379/88.13 |
| 5,734,706 | 3/1998 | Windsor et al. | 379/142 |
| 5,768,356 | 6/1998 | McKendry et al. | 379/201 |
| 5,818,908 | 11/1998 | Kaplan | 379/88.21 |
| 5,864,605 | 1/1999 | Keshav | 379/88.01 |

OTHER PUBLICATIONS

Harry Newton, Newton's Telecom Dictionary, 14th Ed., ISBN 1–57820–023–7, p. 50, Mar. 1998.

*Primary Examiner*—Krista Zele
*Assistant Examiner*—Roland G. Foster

[57] ABSTRACT

A voice response system that functions in a receiving telephone system and learns individual caller behavior. The voice response system stores the callers unique identifier and a menu option selected by the caller in response to a menu manuscript. For subsequent calls by the caller, the caller is presented with a truncated menu manuscript that allows the caller to more quickly connect to the desired system.

19 Claims, 7 Drawing Sheets

INTERACTIVE VOICE RESPONSE SYSTEM WITH CALL TRAINABLE ROUTING

BACKGROUND OF THE INVENTION

1. Field of Invention

This invention relates to call management and voice mailbox systems. In particular, the invention relates to systems that require a caller to choose from among several call routing options.

2. Description of Related Art

Many businesses incorporate a call management system that provides a menu of call routing options, and allows a caller to select from among several different options. Often, the options are arranged in hierarchical layers. A caller is then required to navigate these layers to find the exact option desired, often without knowing if the selected menu option will ultimately lead to the desired end point. That is, since the caller usually does not have available the entire menu to review prior to selecting the options, the caller is essentially navigating a maze, with no guarantee of ending at the desired location. Thus, while call management systems may reduce cost to the business in not having to provide a dedicated operator, the system may cause the callers to become frustrated. In addition, there is an increased cost associated with the on-air time spent as the caller navigates through the menu. In particular, a caller may navigate several layers of the menu in order to reach the desired option. Further, the caller may use the same business on a frequent basis, and thus must navigate through the many menu layers of a frequent basis.

Many businesses also employ a call routing system that directs the caller to select from one of several menu options including connection to a specific individual at a designated extension line. To connect to a specific individual, a caller is often required to listen to an entire menu manuscript or to enter an extension number in order to reach the desired end point.

SUMMARY OF THE INVENTION

This invention solves the problem of having to repeatedly navigate through a complex, multi-layered menu of a call management system and the problem of having to remember a specific extension number of a routinely called individual. The invention provides an apparatus and a method to truncate, or eliminate unnecessary menu layers. A device recognizes a caller, based on a unique identification number, and allows the caller to select a menu option recently used by the caller. Thus, the invention reduces excessive time navigating through the menu, reducing caller frustration and lowering on-air costs.

The invention also allows a caller to a facility to be quickly connected to an extension number previously selected by the caller. The device recognizes the caller based on, for example, the caller's identification number such as the Automatic Number Identification or the telephone number the caller is calling from. The device then asks the caller if connection to the most recently called extension number is desired.

These and other features and advantages of the invention are described in or are apparent from the following detailed description of the preferred embodiments.

BRIEF DESCRIPTION OF THE DRAWINGS

The invention is described in detail with reference to the following drawings, wherein like numerals refer to like elements, and wherein.

DETAILED DESCRIPTION OF PREFERRED EMBODIMENTS

Current call management systems typically require a caller to either navigate through several layers of a manuscript menu, or to listen to a menu of several different options before the caller identifies a desired option. Often, the caller may call the same business or facility and thus receives the entire menu manuscript although the caller knows which option is desired. This can lead to caller frustration and increased costs, particularly when the caller uses a toll-free number such as an 800 number.

Figure 1:
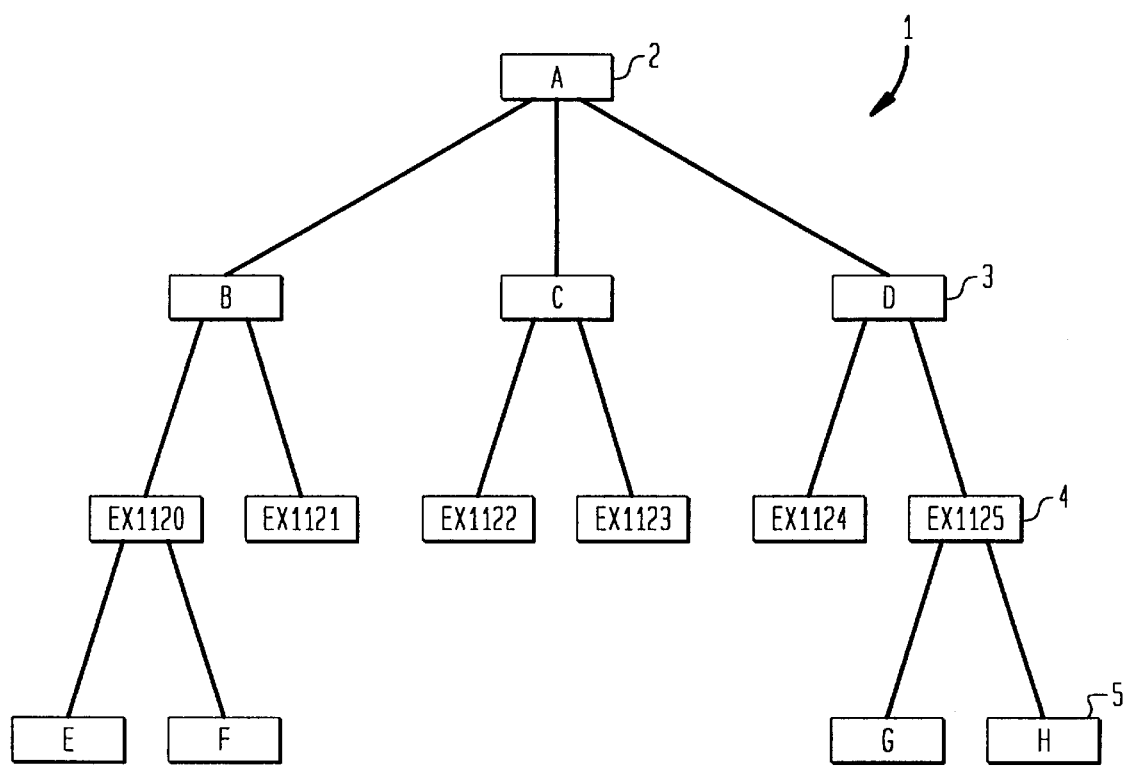
FIG. 1 shows a full-length menu manuscript.

FIG. 1 shows a full length menu manuscript 1. The menu manuscript 1 includes layers 2, 3, 4 and 5. Within each layer, several options are available. The options may correspond to specific telephone extensions or may allow the caller to reach other layers. Thus, to arrive at a desired end point, the caller may have to navigate through several layers. For example, to arrive at extension 1121, the caller must navigate layers 2, 3 and 4 before arriving at extension 1121.

Figure 2:
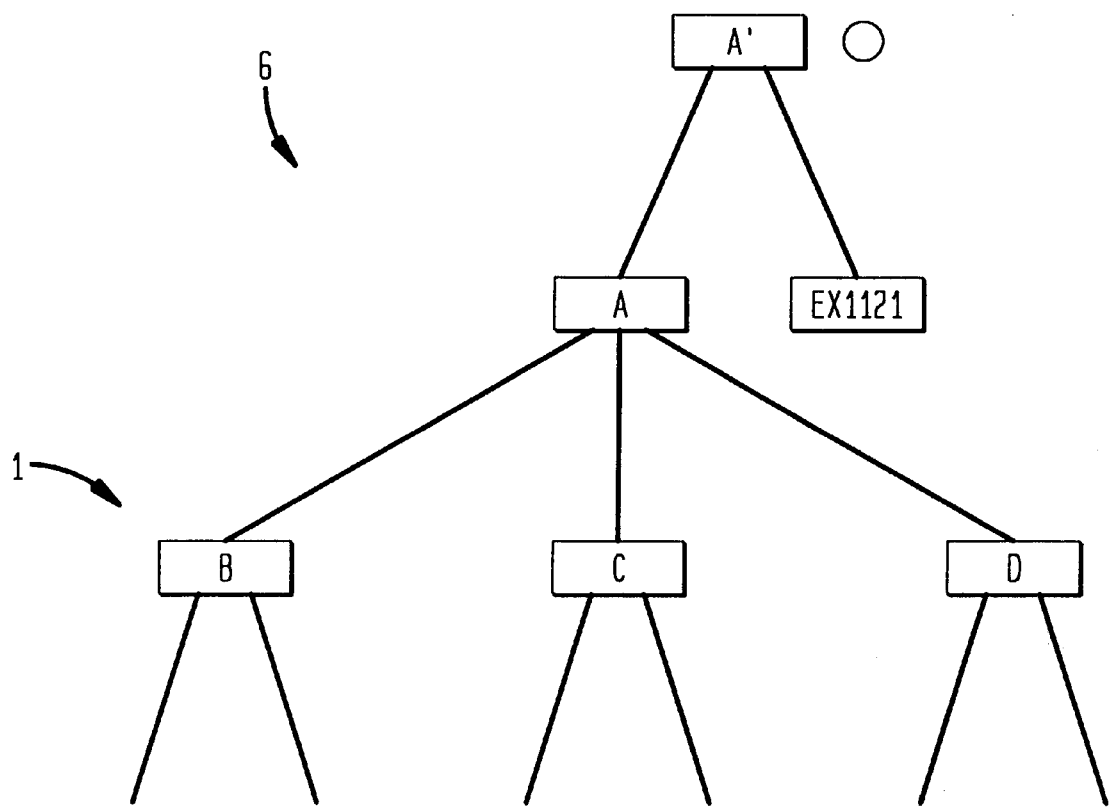
FIG. 2 shows a truncated menu manuscript.

FIG. 2 shows a truncated menu manuscript 6. In FIG. 2, the truncated menu manuscript 6 includes an additional layer "0" that allows the caller to quickly go to the desired telephone extension, 1121, or to allow the caller to use the full-length menu manuscript 1.

Figure 3:
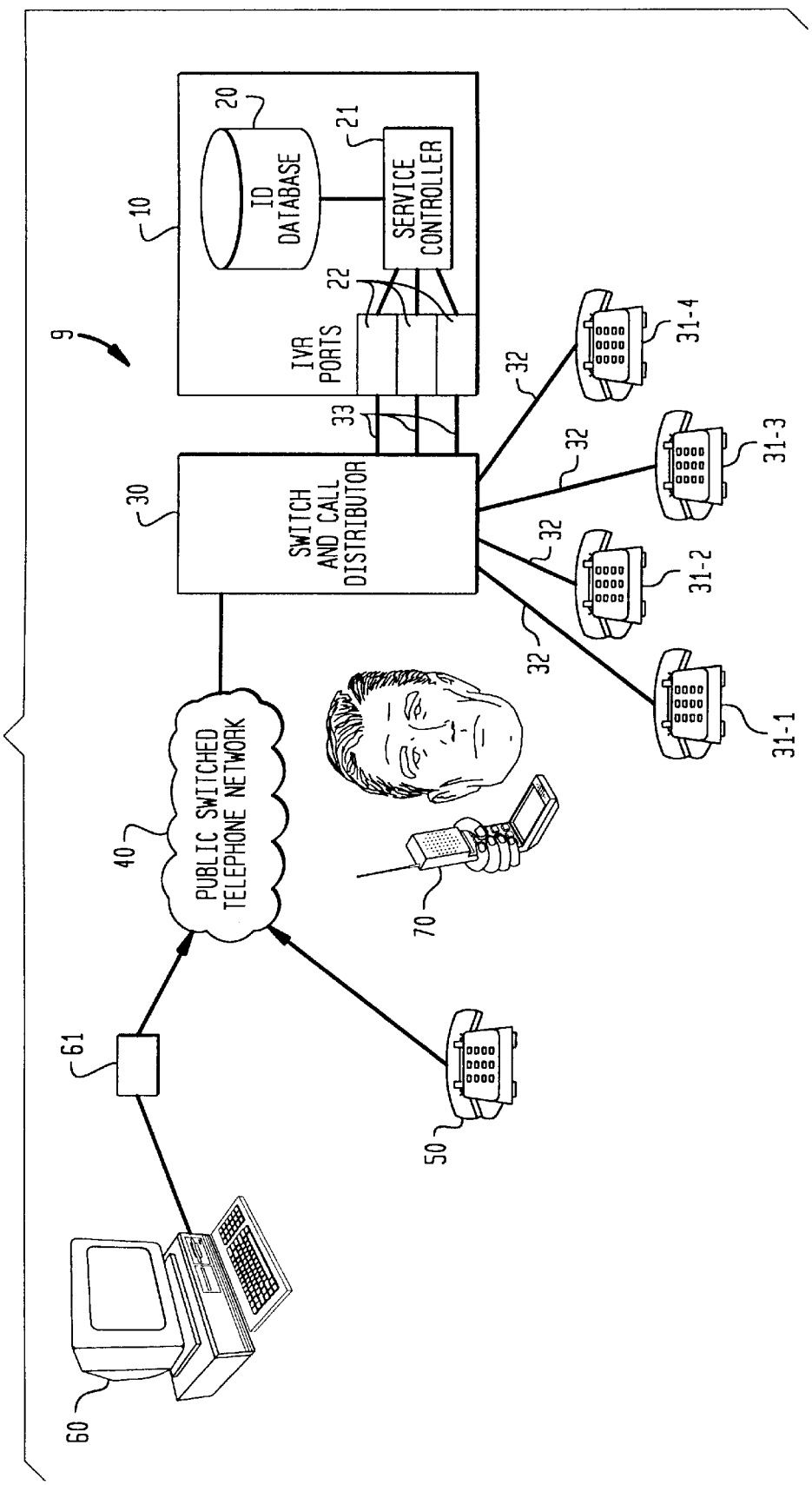
FIG. 3 is a block diagram of an embodiment of the invention.

FIG. 3 is a block diagram of an exemplary embodiment of an interactive voice response (IVR) system 10 according to one aspect of the invention, that can reduce the amount of time and effort the caller expends to select a voice message menu option. The IVR system 10 resides at a facility 9. The IVR system 10 includes a caller identification (ID) database 20, a service controller 21 and IVR ports 22. The IVR system 10 connects to a switch and call distributor 30. Also connected to the IVR system 10 are extension phones 31-1 to 31-4 via extension lines 32. The extension phones 31-1 to 31-4 may be part of a caller assistance system. For example, a caller assistance system may be available to connect the caller to operators who can answer questions regarding computer peripheral devices. Thus, extension phone 31-1 would connect the caller to an operator who answers questions regarding modems, while extension phone 31-2 is used for laser printers, extension phone 31-3 is used for ink-jet printers and extension phone 314 is used for scanners, for example.

The IVR ports 22 connect to the switch and call distributor 30 via extension lines 33. The IVR system 10 may also include a separate data connection (not shown) between the service controller 21 and the switch and call distributor 30. The separate data connection would facilitate transfer of the call from the switch and call distributor 30 to the appropriate extension phone 31-1 to 31-4.

The switch and call distributor 30 also connects to a public switched telephone network (PSTN) 40. However, the invention is not limited to use with a PSTN, and may include any network for connecting a caller to an end point including an intranet, an internal enterprises network, the Internet, and wireless, for example.

In FIG. 3, the IVR system 10 and the switch and call distributor 30 are shown as distinct components. However, the functions of the IVR system 10 and the switch and call distributor 30 could be incorporated into a suitably programmed single component.

The caller connects to the IVR system 10 using a caller's phone 50 via the PSTN 40. Alternately, the caller may connect to the IVR system 10 using a computer 60 equipped with a modem 61 or a wireless telephone 70, for example.

Each caller who calls the facility 9 may be automatically identified by the IVR system 10. The caller may be automatically identified based on the caller's unique caller ID (e.g., the caller's telephone number), for example. Alternately, the caller may be identified by the Automatic Number Identification (ANI) if a facility is equipped with a trunk (e.g., a T1 line) that can carry the ANI.

The ANI may be detected when the call is delivered to the facility 9, since the ANI is signaled prior to the call being delivered. The caller ID, on the other hand, may be signaled between the first and second rings of the call. If the detected ANI is a pilot number, (i.e., the ANI for a large entity may be a single number, known as a pilot number), then the IVR system 10 may not be able to identify a specific caller. In that case, the caller would be presented with a standard or full-length menu manuscript.

The caller ID database 20 stores caller IDs corresponding to callers who have called the facility 9. The caller ID database may also store a history of calls made by the caller to the facility 9 for a predetermined time (e.g., five days) or for a number of calls (e.g., last three calls). Thus, if the caller has not called the facility 9 during the predetermined time, the caller's ID may be deleted from the caller ID database 20. Alternately, the caller ID may be retained in the caller ID database 20, but if the associated caller has not called the facility 9 within the predetermined time, certain automatic call routing features of the IVR system 10 may be disabled with respect to the caller.

When the caller first calls the facility 9 having the IVR system 10, the caller may receive a standard, pre-recorded message containing call routing selections (i.e., a menu manuscript) from which the caller can choose. The pre-recorded message is provided to the caller by the service controller 21. The pre-recorded message presents the caller with a hierarchical menu of call routing options. The number of layers in the hierarchical menu can range from one for a simple system to a large number of layers for a complex system. The caller selects the desired menu items by operating the push buttons on a caller's telephone 50, for example. Alternately, the caller could select the desired menu items by speaking a number, a code, or a name into the handset of the caller's telephone number 50. The caller may also make menu selections, by using the computer 60 or the wireless telephone 70. Other devices for connecting to the IVR system 10 and making menu selections are also possible with this invention.

In the example shown in FIG. 3, a voice message may ask the caller to select from one of the four extension phones 31-1 to 31-4, depending on whether the caller needs help with a modem, a scanner, and inkjet printer or a laser printer. Once the caller has indicated a menu choice, the service controller 21 controls the switch and call distributor 30 to route the caller to the selected one of the extension phones 31-1 to 31-4.

To begin the process, the caller first places a call to the facility 9 having the IVR system 10. The call may be routed through the PSTN 40, for example. The PSTN 40 routes the call to the switch and call distributor 30. The service controller 21 directs the switch and call distributor 30 to transfer the call using normal in-band signaling or adjunct switch application interface (ASAI) procedures. The switch and call distributor 30 then routes the call from the caller to one of the IVR ports 22. The IVR system 10 then answers the call and queries the caller ID database 20 to determine if the caller's ID is stored in the caller ID database 20. If the caller's ID is stored in the caller ID database 20, the service controller 21 can determine the most recent menu selection made by the caller. The menu selection can then be presented to the caller, in the form of an audio message, for example, thereby allowing the caller to short-cut or truncate layers of the menu manuscript provided by the IVR system 10. Thus, the IVR system 10 may present the caller with a full-length menu manuscript or one of several truncated menu manuscripts. Whether the caller receives the full or the truncated menu manuscript, may be based on whether the call to the facility 9 is a first call by that caller or may be based on how recently was the last call from the caller. Further, the degree of truncation, that is, the number of call routing layers removed from the full-length menu manuscript may be based on the most recent call or an earlier call from the caller.

In another aspect of the invention, a last usage date criterion may be established in the IVR system 10. If a call is placed within the time period of the criterion, the caller will receive a truncated menu manuscript. However, if the call exceeds the criterion, the IVR system 10 may present the caller with the full-length menu manuscript.

To implement the IVR system 10, the caller may first be presented with a standard opening message and then, if the IVR system 10 contains a usage history in the caller ID database 20, the service controller 21 may ask if the caller desires to be connected in accordance with the caller's most recent previous choice. For example, if the caller's previous choice was the modem help extension phone 31-1, the service controller 21 would ask if the caller desired to connect to the modem help extension phone 31-1, press 1, for other options, press 2. If the caller indicates "yes" (i.e., connect to the modem help extension phone 31-1 by pressing 1), the service controller 21 connects the caller to the modem help extension phone 31-1. If the caller indicates "no," the service controller 21 plays the full-length menu manuscript as shown in FIG. 1 (i.e., if the caller presses 2, the service controller 21 provides a menu manuscript of other options). The service controller 21 then navigates the caller through the menu manuscript to find selections. After the caller has been connected to the IVR system 10, the service controller 21 sends updated caller information to the caller ID database 20.

Figure 4:
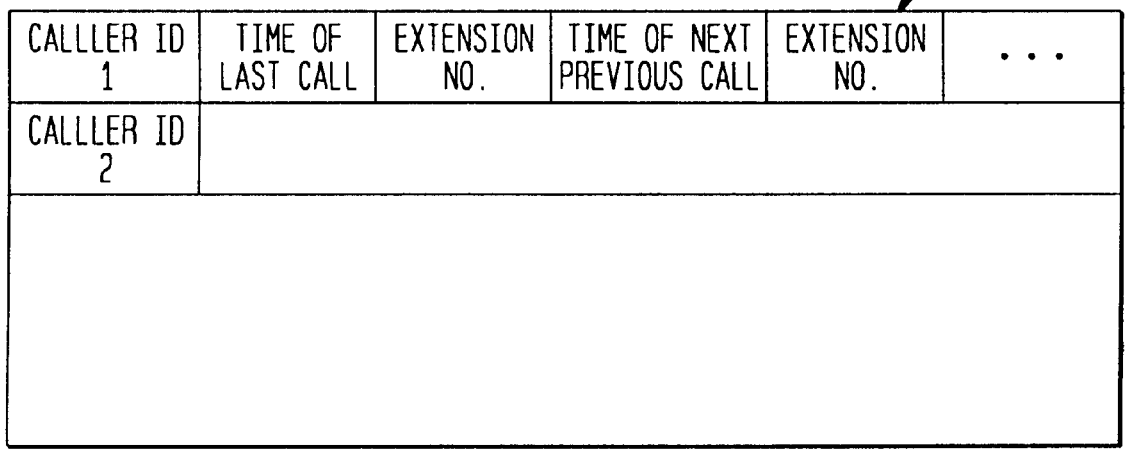
FIG. 4 shows a logical representation of a caller ID database.

FIG. 4 is a logical representation of the caller ID database 20. In FIG. 4, the caller ID database 20 stores the caller ID numbers, the date and time of the most recent call, and the option or extension selected. The caller ID database 20 may be structured to store more than the most recent call. As shown in FIG. 4, the caller ID database may contain data from calls previous to the most recent call.

The updated information sent to the caller ID database 20 may include the caller's ID, the date of the call and the menu option chosen by the caller. The service controller 21 may automatically update the caller ID database 20 after receipt of the call to the facility 9. Alternatively, the service controller 21 may allow the caller to indicate if the caller's usage history should be updated. For example, the service controller 21 may present the caller with an additional audio message asking the caller if the caller's usage history is to be updated. The caller may then elect to have the service controller 21 update the caller's usage history, or may elect to retain the previous selection. In either event, the service controller 21 may update the date of the call to the facility 9.

Figure 5:
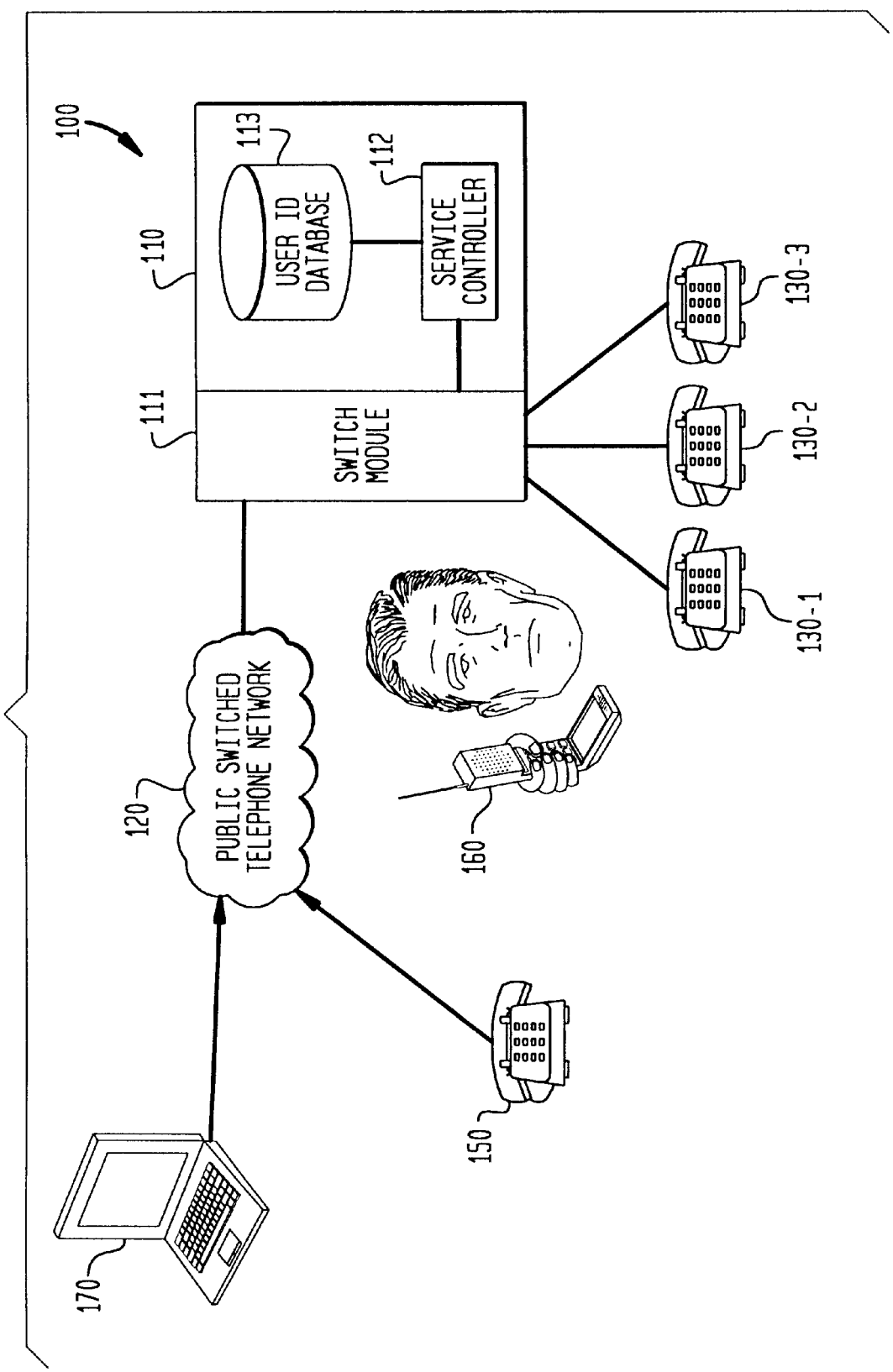
FIG. 5 is a block diagram of another embodiment of the invention.

FIG. 5 shows another embodiment of the invention. In FIG. 5, a facility 100 includes a business telephone system 110 that receives calls from callers via a PSTN 120, for example. The business telephone system 110 includes a switch module 111, a service controller 112 and a caller ID database 113. The business telephone system 110 connects to a number of business telephone system extensions 130-1 to 130-3.

The business telephone system 110 functions in much the same way as the IVR system 10 of FIG. 3. That is, the caller ID database 113 stores caller ID numbers for callers, and call routing information for the callers. The service controller 112 controls the switch module 111 to receive calls from the caller and route them to the appropriate telephone extension 130-1 to 130-3.

The caller connects to the business telephone system 110 of the facility 100 using appropriate communication devices such as a caller's telephone 150, a wireless phone 160 and a computer 170. Connections from the caller to the business telephone system 110 may be made via a PSTN 140. Alternately, the caller can be linked to the business telephone system 110 via the Internet, for example.

In FIG. 5, when the facility 100 receives a call, the service controller 112 determines, based on the caller's ID and other information from the caller ID database 113, whether the caller had previously called the facility 100, and if so, if a current usage history exists for the caller. If the current usage history exists for the caller, the service controller 112 presents the caller with a truncated menu manuscript containing caller-selectable options. That is, the service controller 112 offers to transfer the caller to the most recently chosen telephone extension 130-1 to 130-3 or to a new telephone extension.

For example, if a caller, Ms. Jones, routinely calls Mr. Smith, the service controller 112 could play a message saying "Hello Ms. Jones, to ring my extension press 1, to reach another department, press 2." If Mr. Smith is out of the office, the service controller 112 could play a message saying "Hello Ms. Jones, I'm out of the office today. To reach my voice mail press 1, to reach another department press 2."

The service controller 112 then updates the usage history for the caller and stores the updated results in the caller ID database 113. In the embodiments of the invention, a caller ID, such as the caller's telephone number, may be used to identify the caller. Alternately, the caller's ANI may be used.

Figure 6:
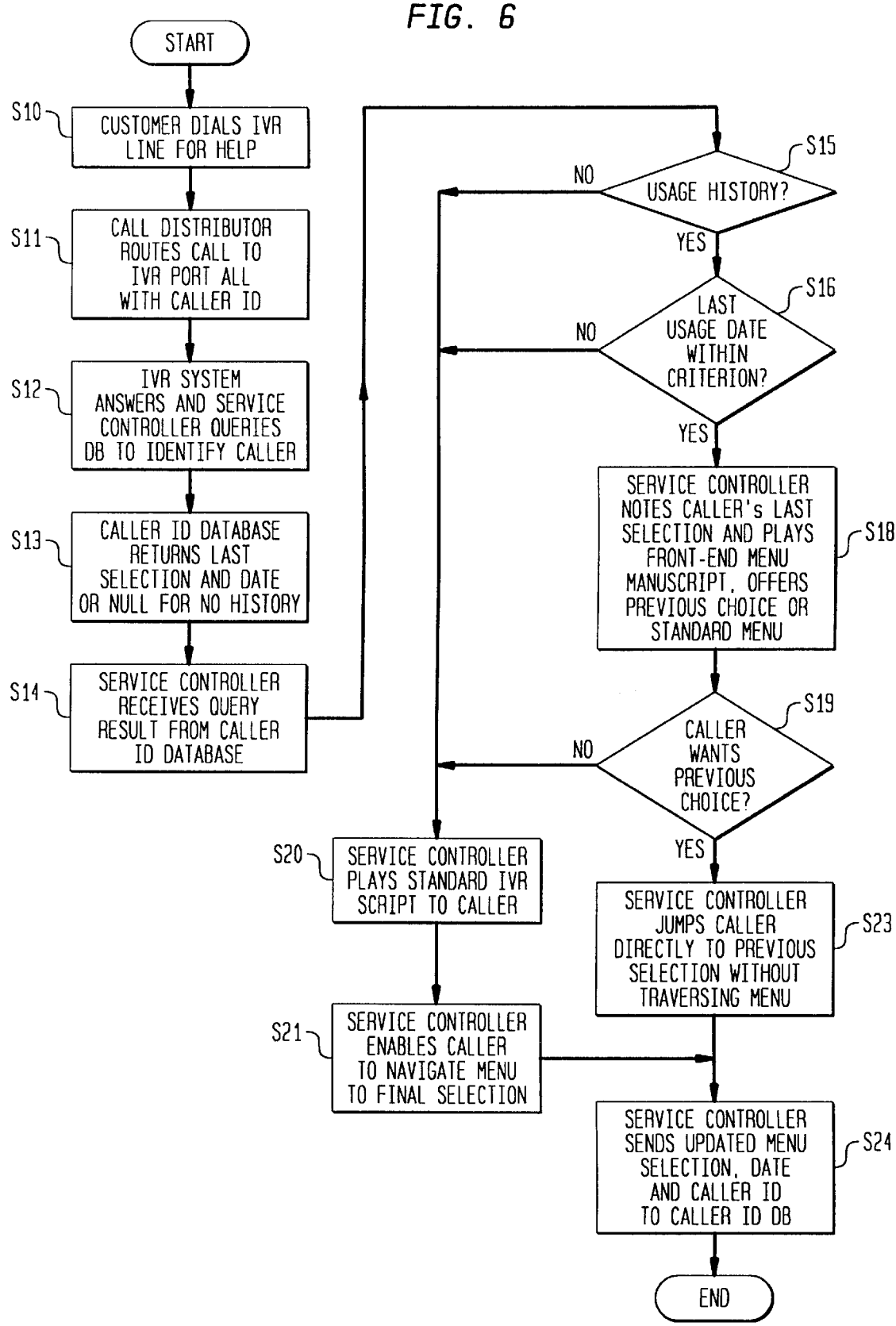
FIG. 6 is a flowchart for implementing the invention shown in FIG. 3.

FIG. 6 is a block diagram of the process for implementing the IVR system 10 of FIG. 3. In FIG. 6 at step S10, the switch and call distributor 30 receives a call for service. The process then moves to step S11. In step S11, the service controller 21 controls the switch and call distributor 30 to route the call to the IVR port 22 along with the caller's ID. The process then moves to step S12. In step S12, the IVR system 10 answers the call and the service controller 21 queries the caller ID database 20 to identify the caller, using the caller's ID. The process then moves to step S13. In step S13, the caller ID database 20 returns the last selection and date associated with the caller ID or returns a null entry if the caller's ID does not exist or has no usage history in the caller ID database 20. The process then moves to step S14.

In step S14, the service controller 21 receives the query from the caller ID database 20. The process then moves to step S15. In step S15, the service controller 21 determines if there is any usage history for the caller's ID. If there is usage history for the caller's ID, the process moves to step S16. Otherwise the process moves to step S20. In step S16, the service controller 21 determines if the last usage date is within the set criterion. If the last usage date is within the set criterion, the process moves to step S18. Otherwise the process moves to step S20. In step S18, the service controller 21 notes the caller's last selection and plays a truncated menu manuscript offering the previous choice or the full-length menu manuscript. The process then moves to step S19.

In step S19, the service controller 21 provides an audio message to the caller asking if the caller desires to be connected to the previous choice. If the service controller 21 receives the command to connect to the previous choice, the process jumps to step S23. Otherwise the process moves to step S20.

In step S20, the service controller 21 plays the full-length menu manuscript to the caller. The process then moves to step S21. In step S21, the service controller 21 enables the caller to navigate through the menu manuscript to the caller's desired final selection. The process then moves to step S24.

In step S23, the service controller 21 routes the caller directly to the previous selection without navigating through the menu manuscript. The process then moves to step S24. In step S24, the service controller 21 sends the updated menu selection, date and caller ID to the caller ID database 20. The process then ends.

Figure 7:
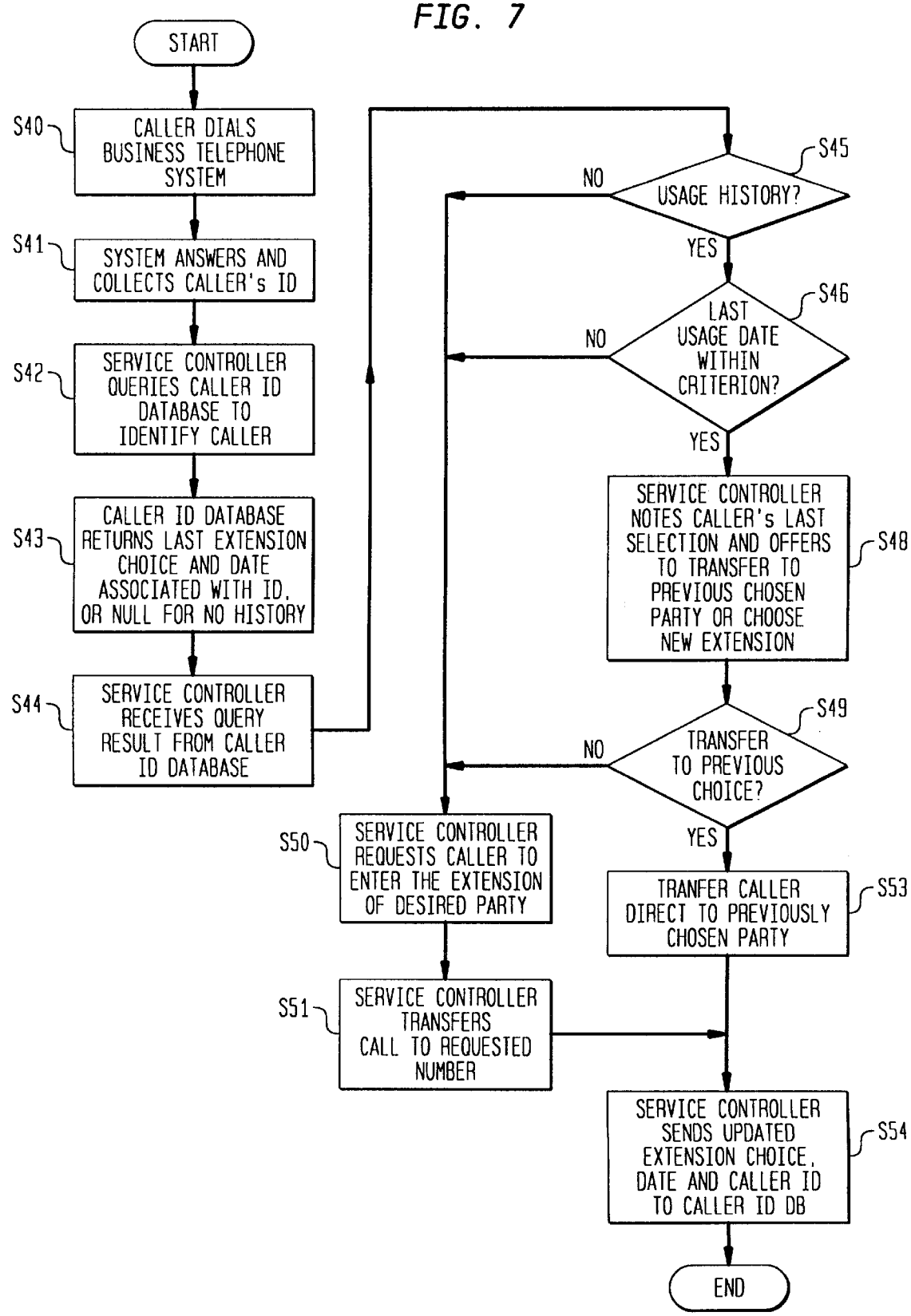
FIG. 7 is a flow diagram for implementing the invention as shown in FIG. 5.

FIG. 7 is a block diagram of the process for implementing the business telephone system 110 of FIG. 2. In FIG. 7, at step S40, the switch module 111 receives a call. The process then moves to S41. In step S41, the business system 110 answers the call and collects the caller's ID. The process then moves to step S42. In step S43, the business telephone system service controller 112 queries the caller ID database 113 to identify the caller using the caller's ID. The process then moves to step S43. In step S43, the caller ID database 113 returns the last extension choice and date associated with the caller's ID, or returns a null if the caller ID contains no usage history. The process then moves to step S44.

In step S44, the service controller 112 receives the query result from the ID database 113. The process then moves to step S45. In step S45, the service controller 112 determines if there is any usage history for the caller ID. If there is usage history for the caller ID, the process moves to step S46. Otherwise the process moves to step S50. In step S46, the service controller 112 determines if the last usage date is within the set criterion. If the last usage date is within the set criterion, the process moves to step S48. Otherwise, the process moves to step S50.

In step S48, the service controller 112 notes the caller's last selection and offers to transfer the caller to the previously chosen party or to connect the caller to a new extension. The process then moves to step S49.

In step S49, the service controller 112 determines if the caller wants to transfer to the previous choice. If the service controller 112 receives the command to connect to the previous choice, the process moves to step S53. Otherwise, the process moves to step S50. In step S50, the service controller 112 requests the caller to enter the extension number of the new partyto be reached. The process then moves to step S51. In step S51, the service controller 112 transfers the call to the requested extension number. The process then moves to step S54.

In step S53, the service controller 112 transfers the caller directly to the previously chosen extension number. The process then moves to step S54. In step S54, the service controller 112 sends updated extension choice, date and caller ID to the caller ID database 113. The process then ends.

In the illustrated embodiments, a suitably programmed general purpose computer controls data processing for the IVR system 10 and the business telephone system 100. However, the processing functions could also be implemented using a single purpose integrated circuit (e.g., an ASIC) having a main or central processor section for overall, system-level control, and separate circuits dedicated to performing various specific computational, functional and other processes under control of the central processor section. The processing can also be implemented using separate dedicated or programmable integrated electronic circuits or devices (e.g., hardwired electronic or logic devices). In general, any device or assembly of devices on which a finite state machine capable of implementing the flow charts of FIGS. 3 and 4 can be used to control data processing.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention as defined in the following claims.

What is claimed is:

1. A method in a voice response system for processing a call from a caller, comprising:

comparing an identifier associated with the caller to data stored in a memory and generating a comparison result;

retrieving a usage history for the caller from the memory if the identifier associated with the caller matches one of the caller identifiers;

forming a truncated menu manuscript, based on the comparison result, the truncated manuscript having fewer options than a full menu manuscript;

selecting at least one option previously selected by the caller from the full menu manuscript as the truncated menu manuscript;

offering the truncated menu manuscript and the full menu manuscript to the caller;

prompting the caller to select an option from either the full menu manuscript or the truncated menu manuscript; and connecting the caller to a selected option, wherein the memory is updated after the caller elects or declines to receive the previously selected option and the caller can decline to have the memory updated after the caller elects or declines to receive the previously selected option.

2. The method of claim 1, wherein the data stored in the memory includes caller identifiers, the comparing step comparing the identifier associated with the caller to the caller identifiers stored in the memory.

3. The method of claim 1, wherein if the usage history indicates that the caller has not called within a given period, a caller identifier that corresponds to the caller is deleted from the memory.

4. The method of claim 1, wherein if the usage history indicates that the caller has not called within a given period, the caller receives the full menu manuscript.

5. The method of claim 1, further comprising:

receiving the call from the caller; and detecting the identifier associated with the caller.

6. The method of claim 5, wherein the selected option is a telephone extension number.

7. The method of claim 5, wherein the identifier is a caller's identification number.

8. The method of claim 7, wherein the caller's identification number is a caller's telephone number.

9. The method of claim 7, wherein the caller's identification number is a caller's automatic number identification.

10. A voice response system for processing a call from a caller, comprising:

a memory that stores caller identifiers; and a controller coupled to the memory that receives an identifier associated with the caller and generates a comparison result by comparing the identifier associated with the caller to the caller identifiers stored in the memory, the controller forming a truncated menu manuscript based on the comparison result and offering the truncated menu manuscript and a full menu manuscript to the caller;

wherein the memory stores a usage history of the caller the usage history is updated in the memory after receiving the call from the caller, the updated usage history includes a caller identifier, a menu option selected by the caller and a date of the call and the caller can decline to have the usage history updated.

11. The voice response system of claim 10, wherein the controller receives the call from the caller and retrieves a caller identifier based on information provided with the call.

12. The voice response system of claim 10, wherein if the usage history indicates that the caller has not called within a given period, the controller deletes the caller identifier that corresponds to the caller from the memory.

13. The voice response system of claim 10, wherein if the usage history indicates that the caller has not called within a given period, the controller outputs only the full menu manuscript to the caller upon receipt of a call from the caller.

14. The voice response system of claim 10, wherein if the caller declines the truncated menu manuscript, the controller sends a full menu manuscript to the caller.

15. The voice response system of claim 10, wherein the truncated menu manuscript includes caller-selectable options, including an extension number of a called party.

16. The voice response system of claim 15, wherein the options include a prerecorded message.

17. The voice response system of claim 10, wherein the identifier associated with the caller is a caller's identification number.

18. The voice response system of claim 17, wherein the caller's identification number is a caller's automatic number identification.

19. The voice response system of claim 17, wherein the caller's identification number is a caller's telephone number.

* * * * *